United States Patent [19]
Okinaka et al.

[11] Patent Number: 6,118,647
[45] Date of Patent: Sep. 12, 2000

[54] ELECTRONIC PART AND METHOD FOR PRODUCING THE SAME

[75] Inventors: Hideyuki Okinaka, Toyonaka; Gen Itakura, Eniwa; Yasuhiro Hioki, Hirakata, all of Japan

[73] Assignee: Matsushita Electric Industrial Co., Ltd., Japan

[21] Appl. No.: 09/242,129

[22] PCT Filed: Jun. 26, 1998

[86] PCT No.: PCT/JP98/02881

§ 371 Date: Feb. 9, 1999

§ 102(e) Date: Feb. 9, 1999

[87] PCT Pub. No.: WO99/00808

PCT Pub. Date: Jan. 7, 1999

[30] Foreign Application Priority Data

Jun. 27, 1997 [JP] Japan ................................. 9-171426

[51] Int. Cl.⁷ ........................... H01L 41/22; H01G 4/008; H01G 2/20
[52] U.S. Cl. .................. 361/305; 361/308.1; 361/321.2; 29/25.35; 29/854; 29/25.41; 29/25.42
[58] Field of Search ..................... 361/303–304, 361/305, 306.1, 306.3, 308.1, 311–313, 321.2; 29/25.35, 25.41, 25.42, 854

[56] References Cited

U.S. PATENT DOCUMENTS 5,735,027 4/1998 Hageman et al. ............... 29/25.35

FOREIGN PATENT DOCUMENTS

| | | |
|---|---|---|
| 58-173823 | 10/1983 | Japan . |
| 3-129809 | 6/1991 | Japan . |
| 3-270004 | 12/1991 | Japan . |
| 5-74649 | 3/1993 | Japan . |

*Primary Examiner*—Dean A. Reichard
*Assistant Examiner*—Anthony Dinkins
*Attorney, Agent, or Firm*—Parkhurst & Wendell, L.L.P.

[57] ABSTRACT

An electronic component applied to a multilayer ceramic and the like, and a manufacturing method thereof. It is aimed to eliminate a step of grinding multilayer-sintered-body that is used for coupling an inner electrode with an outer electrode, and improve electrical contact between the outer electrode and the inner electrode that is thinned in size. Vapor of material different from the inner electrode (12) is collected selectively only on an appearing end of inner electrode (12) embeded in the component during the firing, whereby conductive section (13) is formed. The conductive section is swelled to the side face of sintered body, which realizes electric contact between inner electrode (12) and outer electrode (14) readily.

25 Claims, 3 Drawing Sheets

ELECTRONIC PART AND METHOD FOR PRODUCING THE SAME

TECHNICAL FIELD

The present invention relates to electronic components used as multilayer ceramic components and the like, and a method for producing the same.

BACKGROUND ART

As shown in FIGS. 4(a) and 4(b), conventional multilayer-ceramic-electronic-components are fabricated by alternating layers of ceramic layer 1 and inner electrode 2 so that multilayer body 3 is formed, which is then fired into the multilayer ceramic components.

The conventional multilayer-ceramic-electronic-components however include possibility of defective connections between the inner electrodes and outer electrodes due to the causes below:

(a) Shrinkage difference occurs between ceramic layer 1 and inner electrode 2 after both are fired.

(b) The materials of electrode are vaporized when fired, whereby end face 2a of inner electrode 2 is sometimes recessed from a plane flush with end face 1a of ceramic layer.

When outer electrode (not shown) is applied to multilayer-sintered-body 3a after the ceramic layer 1 and inner electrode 2 are fired, defective connections between the outer electrode and inner electrode 2 can be expected due to the foregoing causes. As a result, desired electrical performance is not effected.

The following countermeasure has been taken to overcome this problem. End face 1a of ceramic layer 1 is ground until end face 2a of inner electrode 2 appears, then the outer electrode is applied to multilayer-sintered-body 3a. This method however increases a number of manufacturing processes, and therefore prolongs a manufacturing time. As a result, a manufacturing cost is boosted.

A number of layers increases at less thickness of inner electrode 2. Even the end face 1a is ground until the end face 2a of inner electrode 2 appears, the appearing area becomes smaller at a greater number of layers. Therefore, insufficient contacts between inner electrode 2 and the outer electrode can be expected. As a result, the desired electric performance is not effected and a number of layers to be increased is limited.

DISCLOSURE OF THE INVENTION

The present invention addresses these problems and aims to provide electronic components free from grinding process after the firing, and the inner electrode thereof being further thinned in size, and also to provide a manufacturing method of the same components.

An electronic component according to the present invention comprises the following elements; (a) inner electrodes embeded in the component, (b) conductive sections formed by collected vapor of conductive material different from the material of electrode, the conductive sections being provided selectively only on the appearing ends of the inner electrodes, and (c) an outer electrode provided on the component and coupled to the inner electrodes via the conductive sections. This structure allows the inner electrodes to form the conductive sections on the appearing end faces. The conductive section is made of the material collected on the appearing end of the inner electrode, the material is different from the inner electrode, and grows larger in step with progress of inner electrode's being sintered. As a result, the outer electrode disposed on the component can be coupled with the inner electrode with ease.

DETAILED DESCRIPTION OF PREFERRED EMBODIMENTS (Exemplary Embodiment 1)

Figure 1:
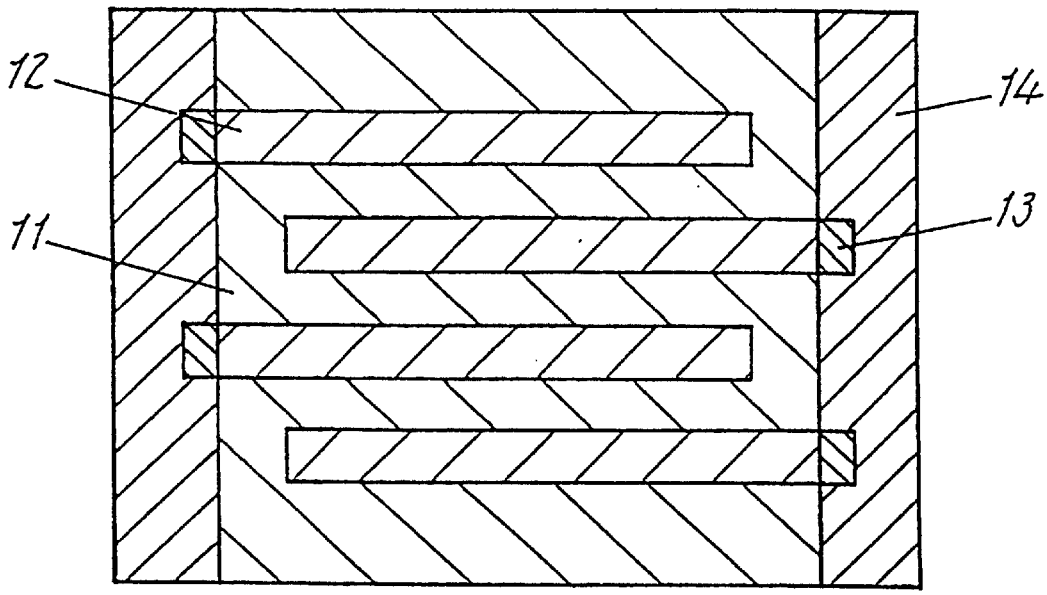
FIG. 1 is a cross section depicting a schematic diagram of a multilayer ceramic capacitor in accordance with a first exemplary embodiment of the present invention.

FIG. 1 is a cross section depicting a schematic diagram of a multilayer ceramic capacitor in accordance with a first exemplary embodiment of the present invention. FIG. 1 lists up the following elements with numbers: ceramic layer 11, inner electrode 12, conductive section 13 formed on an appearing end of the inner electrode, and outer electrode 14.

A manufacturing step of this multilayer ceramic capacitor comprises the following steps.

(a) Laminate inductive unfired sheets, i.e. green sheets (=ceramic layer 11) on which paste of palladium (=inner electrode 12) is silk-screened;

(b) Form a multilayer body by pressing the green sheets;

(c) Dice the multilayer body into chips of desirable sizes;

(d) Burn out the binder at 350–400° C.;

(e) Place the chips on platinum (Pt) mesh and fire the chips at 1300–1350° C. in the air to produce sintered bodies 20; and (f) Bake Ag electrodes so that it covers conductive section 13 swelling on the side of sintered body 20 from inner electrode 12, thereby forming an outer electrode 14. The sintered body 20 needs not to be ground.

Another manufacturing method is cited as follows for being compared with the foregoing method of the present invention. In this cited method, the chips in which the binder is burnt-out are fired in a container without Pt mesh in the same conditions as the foregoing method, then Ag electrodes are baked to the sintered body, this is also same as the foregoing method.

The multilayer ceramic capacitor in accordance with the first exemplary embodiment produces a defective ratio not more than 1/10,000.

Details of defectives are (a) decreasing electrostatic capacity due to defective contacts between inner electrode 12 and outer electrode 14, and (b) increasing of dielectric loss. On the other hand, the conventional multilayer ceramic capacitor in accordance with the conventional method using only the container has over 20% defectives of which details are the same as above.

Figure 2:
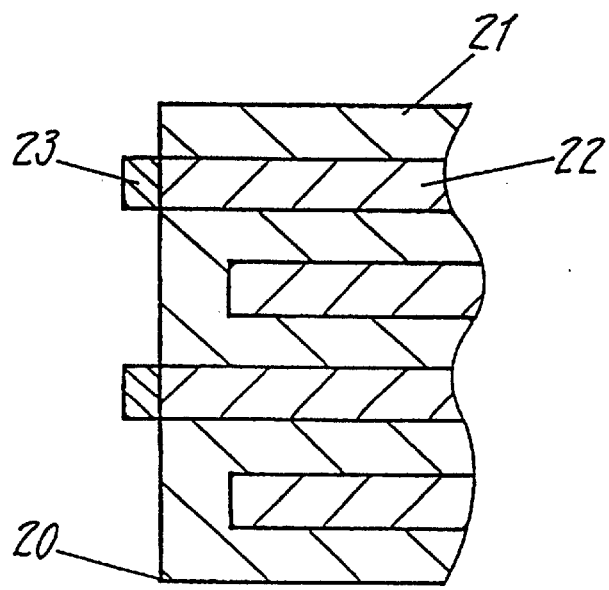
FIG. 2 is a cross sectional view of a schematic diagram of sintered multilayer ceramic capacitor in accordance with a first exemplary embodiment of the present invention.

According to the capacitor in accordance with the first exemplary embodiment, conductive section 23, formed on the appearing end of inner electrode 22 after the firing, extends positively from the side face of sintered body 20 as shown in FIG. 2. Inner electrodes 22 are thus electrically coupled with outer electrode 14 readily. On the other hand, according to the conventional capacitor by using only the container, the end face 2a of inner electrode is recessed from a plane flush with end face 1a of ceramic layer 1 by max. ca. 10 μm. Applying Ag paste to this conventional structure would cause substantial failed-connections to inner electrodes 2.

Figure 4A:
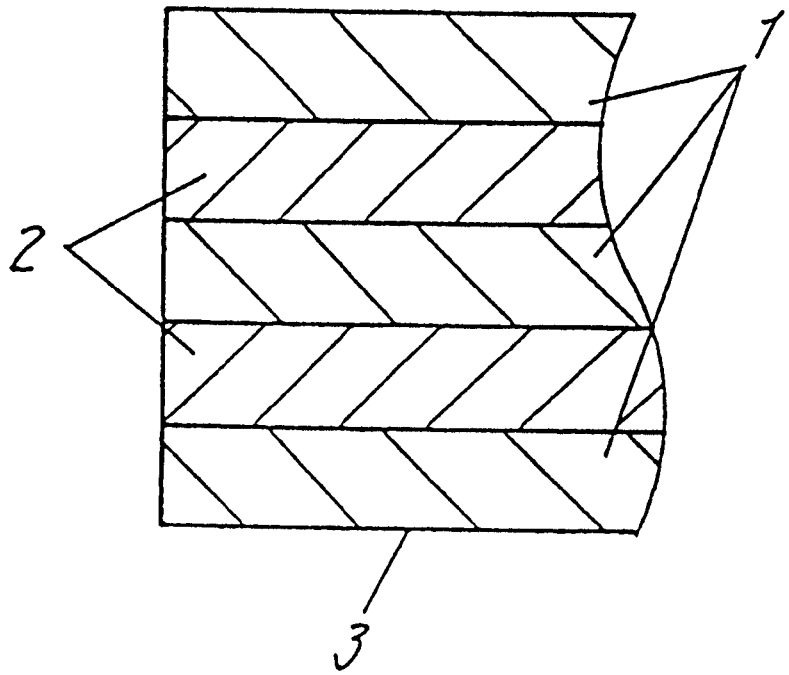
FIG. 4(a) is a cross sectional view of a schematic diagram of a conventional multilayer-ceramic-capacitor before the firing.
Figure 4B:
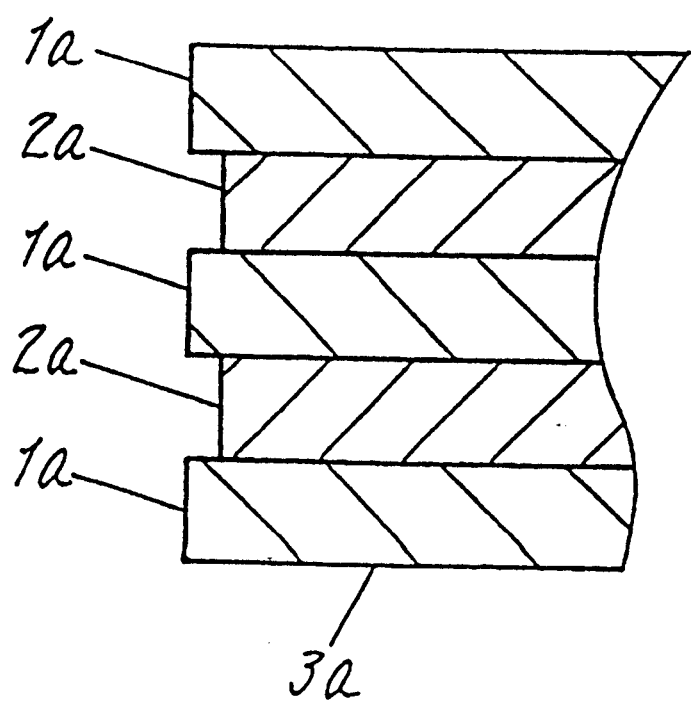
FIG. 4(b) is a cross section depicting a schematic diagram of the conventional multilayer-ceramic-capacitor after the firing.

This is because that Pd is vaporized at a high temperature, and the vaporizing of Pd from end face 2a of inner electrode 2 progresses during the firing. As a result, in the case of the conventional multilayer ceramic capacitor by using only the container, end face 2a is recessed from a plane flush with the ceramic surface as shown in FIG. 4(b). Since the multilayer ceramic capacitor according to the first exemplary embodiment is fired together with Pt mesh, Pt vapor is selectively collected by Pd. Therefore, the Pt vapor produced by firing the Pt mesh is collected on the appearing end face of inner electrode 22 comprising mainly Pd so that Pd is prevented from being vaporized. Further supplying of Pt swells conductive section 23 from the appearing side face so that the appearing face of inner electrode 22 extends positively from the side face of sintered body 20.

This is one of applications of the phenomenon obtained in manufacturing nitride acid i.e. Pt catalyst employed in the manufacturing of nitride acid produces Pt vapor, which is then selectively collected by Pb mesh. This was already disclosed in e.g. A. E. Heywood: Platinum Recovery in Ammonia Oxidation Plants, Platinum Metals Review, 17 (No.4), page 118–129 (1973).

Conductive section 13 including Pt is thus formed on the appearing end of inner electrode 12, of which main ingredient is Pd, of the multilayer ceramic capacitor according to the first exemplary embodiment. Outer electrode 14 is coupled to inner electrode via conductive section 13. The extension of conductive section 13 from the side face of sintered body 20 increases contacting area with outer electrode 14, whereby electrical contact between inner electrode 12 and outer electrode 14 is substantially improved.

It is not limited to the combination of Pt and Pd as in this exemplary embodiment to produce this effect, but another specific conductive material, and an electrode material that can selectively collect the vapor of the specific conductive material can be combined to produce the same effect.

In this exemplary embodiment, instead of baking the Ag paste as outer electrode 14, an electrode, of which main ingredients are Ag and resin, is applied and then dried to form outer electrode 14. When this outer electrode is employed, the defective ratio is as low as not more than 1/10,000. The defective are related to (a) decreasing electrostatic capacity, and (b) increasing dielectric loss. When the same outer electrode is employed in the conventional multilayer ceramic capacitor manufactured by using only container, the defective ratio related to decreasing electrostatic capacity and increasing dielectric loss amounts to as high as over 99%.

Further the multilayer ceramic capacitor according to this exemplary embodiment, conductive section 13 including Pt is formed on the appearing end of inner electrode 12 even if inner electrode 12 is thinned. Therefore, the electrical contact between inner electrode 12 and outer electrode 14 is little affected by slimming down of inner electrode 12. For instance, the thickness of inner electrode 12 is reduced from 1.5 μm to 0.8 μm and the baked Ag electrode is employed as outer electrode 14, then defectives related to decreasing of electrostatic capacity as well as increasing of dielectric loss are counted. The resultant defective ratio is still not more than 1/10,000.

The conventional multilayer ceramic capacitors fired by using only the container are processed as follows to reduce the defectives. (a) The thickness of inner electrode is thinned to 1.5 μm, (b) a side face of multilayer-sintered-body 3a is ground until inner electrode 2 appears, then (c) the outer electrode (not shown) is baked in order to couple with the inner electrode. As a result, the defective ratio decreases to not more than 1/10,000. The defectives are related to decreasing of electrostatic capacity and increasing of dielectric loss. When the thickness of inner electrode 2 is further thinned to 0.8 μm, the foregoing defective ratio increases to 15/10,000. This is because that thinned layers of inner electrode 2 by the conventional method directly affect to reduce the contact area with the outer electrode. The conventional method comprises the steps of (1) grinding the side face of multilayer-sintered-body 3a until inner electrode appears, and then (2) baking the outer electrode.

Figure 3:
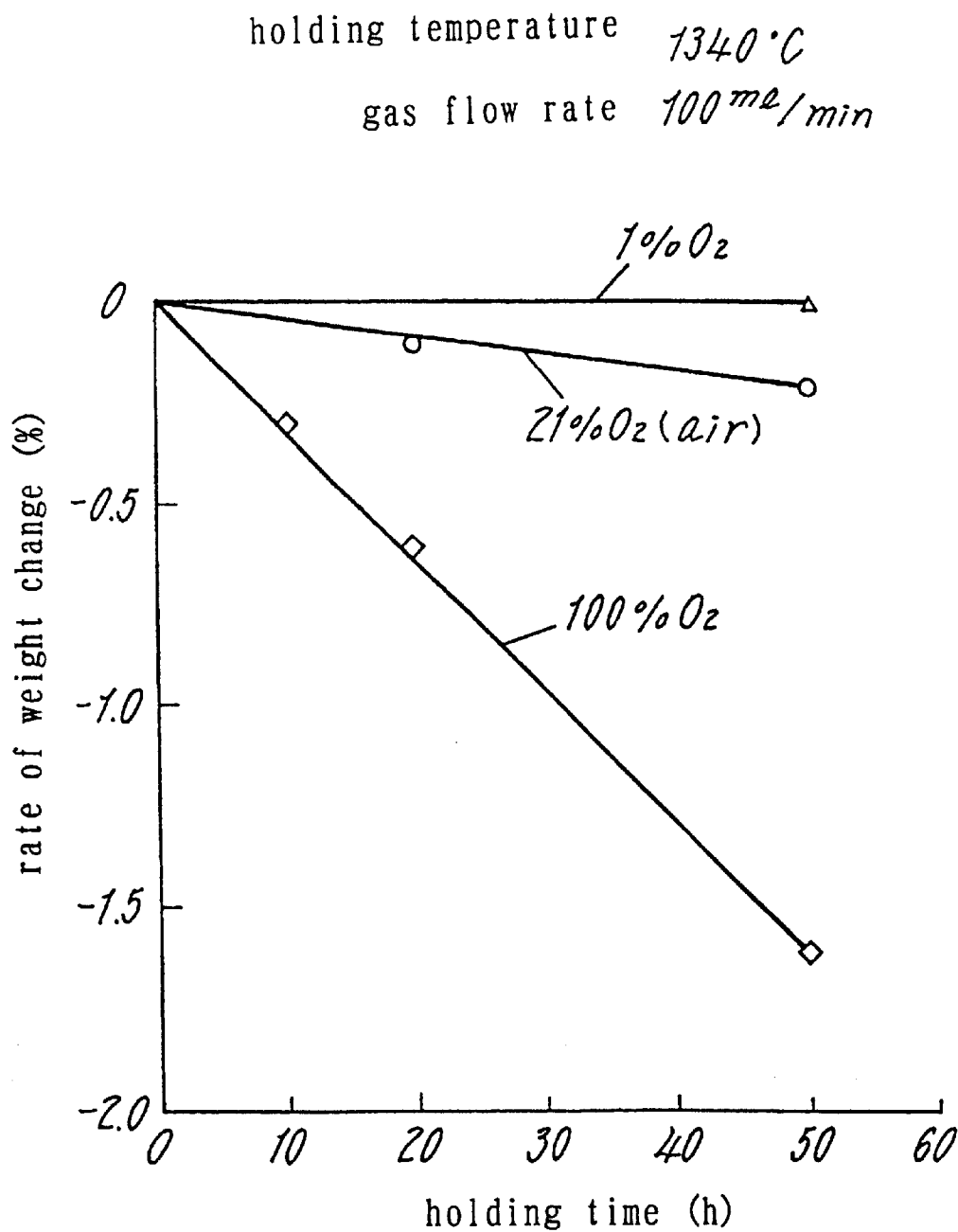
FIG. 3 is a characteristic diagram illustrating how the weight reduction of platinum mesh depends on oxygen density.

A firing atmosphere is a critical item of manufacturing the multilayer ceramic capacitor 1 in accordance with the first exemplary embodiment. For instance, when oxygen density is 100%, the defectives related to decreasing of electrostatic capacity and increasing of dielectric loss decrease to a defective ratio of 5/100,000. However, the defective ratio increases sharply to over 20% in nitrogen air current of which oxygen density is 1%. When conductive section 23 formed on the appearing end of inner electrode 22 is examined after firing, the extended amount from sintered body 20 in the first case is increased comparing with that of firing in the air; however, conductive section 23 is recessed from a plane flush with sintered body 20 in the second case. FIG. 3 depicts that weight reduction of Pt mesh used in this exemplary embodiment depends on oxygen densities at a high temperature. As shown in FIG. 3, the vaporized amount of Pt increases at a high oxygen density, on the other hand little vapor is produced at a low density. Therefore, when a high oxygen density is maintained during the firing, supply of Pt vapor increases, whereby conductive section 23 swells from the appearing end of inner electrode 22; however, Pt vapor is not supplied at a low oxygen density and thus conductive section 23 is not formed on the appearing end of inner electrode 22 due to the progress of vaporizing Pd. This phenomenon brings the foregoing result.

(Exemplary Embodiment 2)

The second exemplary embodiment is described with reference to FIG. 1 and FIG. 2. A manufacturing step of multilayer ceramic capacitors comprises the following steps.

(a) Laminate inductive unfired sheets, i.e. green sheets (=ceramic layer 11) on which paste of palladium (=inner electrode 12) is silk-screened;

(b) Form a multilayer body by pressing the green sheets;

(c) Dice the multilayer body into chips of desirable sizes;

(d) Burn out the binder at 350–400° C.;

(e) Drip chloroplatinic acid solution corresponding to 20 mg of Pt onto 25 ml zirconia powder of which grain size is ca. 20 μm.

(f) Agitate the resultant mixture of (e) and dry it to form zirconia powder affixed with Pt.

(g) Sprinkle the resultant zirconia powder of (f) over the binder-burnt-out chips of which apparent volume is 25 ml, and put it into a container.

(h) Fire the container under the same condition as the first exemplary embodiment.

(i) Bake the Ag electrode to the fired body as outer electrode 14.

The following method is tried as a first comparison with the manufacturing method of the second exemplary embodiment i.e. Sprinkle zirconia powder free from Pt over the binder-burning-out chips, fire the resultant chips in the same condition as this embodiment, and bake the outer electrode. Also firing of the chips free from zirconia powder is tried as a second comparison.

The multilayer ceramic capacitors according to the second exemplary embodiment produce defectives at the ratio of 5/100,000. These defectives are related to decreasing of electrostatic capacity due to failed connections and increasing of dielectric loss. The multilayer ceramic capacitor according to the first comparison method produces a defective ratio exceeding 20%. These resultant figures are the same as obtained in the first exemplary embodiment. In other words, using the Pt mesh during the firing produces the same result as using the powder affixed with Pt. When Pt component is mixed during the firing, conductive section 13, formed on the appearing end of inner electrode 12 of which main ingredient is Pd, extends from the side face of sintered body 20 according to the theory discussed in the first exemplary embodiment. A number of the defectives related to decreasing of electrostatic capacity and increasing of dielectric loss further decreases in the second exemplary embodiment comparing with that of in the first exemplary embodiment. This is because that the Pt vapor is supplied more evenly to the appearing end of inner electrode 12 by sprinkling the zirconia powder over the chips.

In the case of multilayer ceramic capacitor according to the second exemplary embodiment, dried outer electrode 14 comprising mainly Ag and resin is applied instead of baking Ag paste as outer electrode 14. This structure produces a defective ratio of not more than 3/100,000, which is less than that in the first exemplary embodiment. These defectives are related to decreasing of electromagnetic capacity as well as increasing of dielectric loss.

As discussed in the first exemplary embodiment, it is an effective way that the air is changed into oxygen in order to promote the vaporizing of Pt thereby to increase the supply of the Pt vapor to the appearing end of inner electrode 12 of which main ingredient is Pd. This method can further decrease the defectives related to decreasing of electromagnetic capacity as well as increasing of dielectric loss.

The multilayer ceramic capacitors prepared in the second exemplary embodiment produce defectives of sticking to sintered bodies among themselves. This defective ratio ranges from 2/10,000 to 3/10,000. On the other hand, the second comparison method produces the same defectives exceeding 15% of defective ratio. These figures prove that sprinkling the powder affixed with Pt over the chips are effective both for even supply of Pt vapor and for avoiding the sticking of chips with each other.

(Exemplary Embodiment 3)

Multilayer ceramic capacitors in accordance with the third exemplary embodiment are manufactured through the following steps.

(a) Put the binder-burning-out chips and zirconia powder affixed with Pt, both are manufactured by the same method as discussed in the second exemplary embodiment, into a cylindrical heat resistant container having vents on both ends.

(b) Insert the container into a tubular furnace of which core pipe is held horizontally.

(c) Fire the container at a high temperature not less than 900° C. by rotating the container a half in a minute and with air current. The temperature condition is same as the first exemplary embodiment.

(d) Bake an Ag electrode as outer electrode 14.

The defective ratio, related to the decreasing of electrostatic capacity and the increasing of dielectric loss, of this capacitors is 1/100,000, which further decreases from that in the second exemplary embodiment. This is because that the container spinning improves the thermal and atmospheric evenness during the firing, whereby the Pt vapor is supplied smoothly and evenly to the appearing end of inner electrode 12. The cylindrical container is preferably rotated at the higher temperature at which the Pt affixed to zirconia powder starts vaporizing.

As discussed in the first exemplary embodiment, it is an effective way that the air is changed to oxygen in order to promote the vaporizing of Pt thereby to increase the supply of the Pt vapor to the appearing end of inner electrode 12 of which main ingredient is Pd. This method can further decrease the defectives related to decreasing of electromagnetic capacity as well as increasing of dielectric loss.

In the case of multilayer ceramic capacitor according to the third exemplary embodiment, dried outer electrode 14 is provided instead of baking Ag paste as outer electrode 14. This structure produces a defective ratio of not more than 1/100,000, which is less than that in the second exemplary embodiment. These defectives are related to decreasing of electromagnetic capacity as well as increasing of dielectric loss.

The defective ratio of sticking to the sintered bodies among themselves after the firing is not more than 1/100,000, which is less than that in the second exemplary embodiment. This is because that the spinning of cylindrical container rolls the chips, which are fired with receiving shocks appropriate to avoiding the stickings. In this regard, the container preferably starts spinning from a lower temperature; however, because the binder-burning-out chips are fragile and vulnerable to damages, it is desirable to spin the container at the high temperature where the mechanical strength of the chips starts increasing. The defective ratio of appearance such as chip-off and cracks of sintered bodies after the firing is not more than 1/10,000.

In this third exemplary embodiment, the binder-burning-out chips and zirconia powder affixed with Pt are put in the cylindrical container having vents on both ends, which is then fired with rotating. The same materials are put into a pot and then fired with agitating by a jig such as a screw, whereby the same effect is produced.

(Exemplary Embodiment 4)

The multilayer ceramic capacitors in the fourth exemplary embodiment are manufactured by the following steps.

(a) Put the binder-burnt-out chips that have been manufactured by the same method as the first exemplary embodiment, into a cylindrical container with lids made of Pt mesh on both ends.

(b) Insert the container into a tubular furnace of which core pipe is held horizontally.

(c) Fire the container at a high temperature not less than 900° C. with rotating the container a half in a minute and with air current. The temperature condition is the same as the first exemplary embodiment.

(d) Bake an Ag electrode as outer electrode 14.

The defective ratio, related to the decreasing of electrostatic capacity and the increasing of dielectric loss, of this capacitors is 5/100,000, which further decreases from that in the first exemplary embodiment. This is because that the container spinning improves the thermal and atmospheric evenness during the firing as discussed in the third exemplary embodiment.

In the case of multilayer ceramic capacitor according to the fourth exemplary embodiment, dried outer electrode 14 comprising mainly Ag and resin is applied instead of baking Ag paste as outer electrode 14. This structure produces a defective ratio of not more than 8/100,000, which is less than that in the first exemplary embodiment. These defectives are related to decreasing of electromagnetic capacity as well as increasing of dielectric loss.

The defective ratio of sticking to the sintered bodies among themselves after the firing is not more than 1/100,000, and the defective ratio of appearance such as chip-off and cracks of sintered bodies after the firing is 5/10,000. These figures are worse than those in the third exemplary embodiment. In the fourth exemplary embodiment, the container is rotated without putting the zirconia powder, which increases shocks among the sintered bodies during the spinning.

Instead of the cylindrical container having the lids made of Pt mesh on both ends, a tube made of Pt or a cylindrical container of which the inside wall is plated with Pt may be used to produce the same effect.

All the exemplary embodiments heretofore discuss the manufacturing methods of the multilayer ceramic capacitors having an inner electrode that comprises mainly Pd. These manufacturing methods can be applied with the same effect to whatever the ceramic electronic components are, as far as they have inner electrode comprising mainly Pd and having appearing ends on the surface of the component. These methods can be applicable to, e.g. multilayer piezoelectric actuator, multilayer chip thermistor, ceramic printed wiring board and the like. Further, it is not limited to the combination of Pd-made inner electrode and Pt-vapor collected at the appearing ends, but another specific conductive material, and an electrode material that can selectively collect the vapor of the specific conductive material can be combined to produce the same effect.

INUDSTRIAL APPLICABILITY

An electronic component has an inner electrode in the component. A conductive section is formed selectively only on an appearing end of the inner electrode. This conductive section is made of collected vapor of a material different from the inner electrode. An outer electrode disposed on the component is coupled to the inner electrode via this conductive section. Even when the inner electrode is thinned in size, electrical contact between the inner and outer electrodes is secured free from a process of grinding a side face of sintered body after the firing.

What is claimed is:

1. An electronic component comprising:
   an inner electrode provided in said component; and
   a conductive section formed selectively on an appearing end of said inner electrode, said conductive section made of collected vapor of a material different from said inner electrode.

2. The electronic component of claim 1, wherein said inner electrode comprises mainly palladium (Pd), and the different material comprises mainly platinum (Pt).

3. The electronic component of claim 1, wherein said inner electrode is coupled with an outer electrode provided on said component via said conductive section.

4. The electronic component of claim 3, wherein a contact area between said conductive section and the appearing end of said inner electrode is less than a contact area between said conductive section and said outer electrode.

5. The electronic component of claim 3, wherein said outer electrode comprises mainly conductive material and resin.

6. An electronic component comprising:
   an inner electrode provided in said component; and
   a conductive section formed on an appearing end of said inner electrode embeded in said component, said conductive section including a material different from said inner electrode and swelling onto a side face of said component due to crystal growth.

7. An electronic component comprising:
   an inner electrode provided in said component and comprising mainly palladium (Pd);
   a conductive section including platinum (Pt);
   an outer electrode provided to an appearing end of said inner electrode via said conductive section.

8. The electronic component of claim 7, wherein a contact area between said conductive section and the appearing end of said inner electrode is less than a contact area between said conductive section and said outer electrode.

9. The electronic component of claim 7, wherein said outer electrode comprises mainly conductive material and resin.

10. A method of manufacturing an electronic component comprising the step of:
    firing a base body of said component having an inner electrode together with a material generating vapor to be collected selectively on an appearing end of said inner electrode so that a conductive section is formed on the appearing end of said inner electrode, and said conductive section swells from a side face of said base body.

11. The method of manufacturing an electronic component of claim 10, further comprising the step of forming an outer electrode on the sintered body after the firing to provide an electrical contact with the conductive section.

12. The method of manufacturing an electronic component of claim 11, wherein said outer electrode comprises mainly conductive material and resin.

13. The method of manufacturing an electronic component of claim 10, wherein one of a material generating vapor to be collected selectively on the appearing end of said inner electrode and a material different from said inner electrode is affixed to powder.

14. The method of manufacturing an electronic component of claim 10, wherein said inner electrode comprises mainly palladium (Pd), and wherein one of a material generating vapor to be collected selectively on the appearing and a material different from said inner electrode comprises mainly platinum (Pt).

15. The method of manufacturing an electronic component of claim 14, wherein atmosphere during the firing has a higher oxygen density than that in the air.

16. A method of manufacturing an electronic component comprising the step of:
    firing a base body of said component having an inner electrode together with a material different from said inner electrode so that a conductive section is formed on an appearing end of said inner electrode, and said conductive section swells from a side face of said base body.

17. A method of manufacturing an electronic component comprising the steps of:
    burning out a binder included in a molded ceramic body having an inner electrode comprising mainly palladium (Pd); and
    firing the burned ceramic body together with a material comprising mainly platinum (Pt) in a heat-proof container with one of agitating and rotating;
    so as to form a conductive section on an appearing end of the inner electrode, the conductive section swelling to a side face of the burned ceramic body.

18. The method of manufacturing an electronic component of claim 17, further comprising the step of forming an outer electrode on the sintered body after the firing to provide electrical contact with the conductive section.

19. The method of manufacturing an electronic component of claim 18, wherein the outer electrode comprises mainly conductive material and resin.

20. The method of manufacturing an electronic component of claim 17, wherein a material comprising mainly platinum (Pt) is affixed to powder.

21. The method of manufacturing an electronic component of claim 17, wherein the heat-proof container comprises platinum (Pt).

22. The method of manufacturing an electronic component of claim 17, wherein one of the agitating and rotating is performed in a temperature range where the material comprising mainly Pt can vaporize.

23. The method of manufacturing an electronic component of claim 17, wherein one of the agitating and rotating is performed in a temperature range where mechanical strength of the burned ceramic body increases.

24. The method of manufacturing an electronic component of claim 17, wherein atmosphere during the firing has a higher oxygen density than that in the air.

25. The method of manufacturing an electronic component of claim 17, wherein the heat-proof container has a vent.

* * * * *